United States Patent

Morikawa et al.

[11] Patent Number: 6,031,593
[45] Date of Patent: Feb. 29, 2000

[54] METHOD OF MANUFACTURING SPACING LAYER FOR LIQUID CRYSTAL DISPLAY USING LIGHT SHIELDING LAYER AS A MASK

[75] Inventors: Masahiko Morikawa, Tenri; Shinji Shimada, Kashihara, both of Japan

[73] Assignee: Sharp Kabushiki Kaisha, Osaka, Japan

[21] Appl. No.: 08/911,281

[22] Filed: Aug. 14, 1997

[30] Foreign Application Priority Data

Aug. 23, 1996  [JP]  Japan ................................. 8-222900

[51] Int. Cl.⁷ .................... G02F 1/1339; G02F 1/1333; G02F 1/13
[52] U.S. Cl. ......................... 349/155; 349/110; 349/187
[58] Field of Search ................................. 349/155, 110, 349/187

[56] References Cited

U.S. PATENT DOCUMENTS

| | | | |
|---|---|---|---|
| 5,128,786 | 7/1992 | Yanagisawa | 349/155 |
| 5,338,240 | 8/1994 | Kim | 349/155 |
| 5,387,445 | 2/1995 | Horiuchi et al. | 349/155 |
| 5,499,128 | 3/1996 | Hasegawa et al. | 349/187 |
| 5,739,882 | 4/1998 | Shimizu et al. | 349/123 |
| 5,757,451 | 5/1998 | Miyazaki et al. | 349/155 |
| 5,805,250 | 9/1998 | Hatano et al. | 349/96 |
| 5,831,703 | 11/1998 | Nishiguchi et al. | 349/187 |

FOREIGN PATENT DOCUMENTS 6-301040  10/1994  Japan .
7-181317   7/1995  Japan .

*Primary Examiner*—William L. Sikes
*Assistant Examiner*—Kari M. Horney
*Attorney, Agent, or Firm*—Nixon & Vanderhye P.C.

[57] ABSTRACT

On the first substrate that serves as an active-element-side substrate, pixel electrodes are formed with a flattening film interpolated in between. On the second substrate that serves as an opposing-side substrate, light-shielding films are formed into an island pattern which allows the light-shielding films to shield the respective active elements on the first-substrate side from light, and gap-controlling sections are formed into the same island pattern as the light-shielding films by exposing positive-working photosensitive resin layer that has been applied onto the entire surface of the second substrate from the back-surface side of the second substrate by using the light-shielding films as a photomask. The flattening film makes it possible to suppress the occurrence of disclination in the liquid crystal molecules. Therefore, the light-shielding films can be formed as the island pattern that only shield the active elements from light, and consequently it is possible to improve the aperture rate. Further, since the gap-controlling layer can be formed at portions other than the pixel electrodes, it is possible to avoid degradation in the contrast ratio of a liquid crystal display.

4 Claims, 7 Drawing Sheets

EXPOSURE FROM
BACK-SURFACE SIDE

METHOD OF MANUFACTURING SPACING LAYER FOR LIQUID CRYSTAL DISPLAY USING LIGHT SHIELDING LAYER AS A MASK

FIELD OF THE INVENTION

The present invention relates to a liquid crystal display used for displays of the direct-viewing type and projection type, and also concerns a manufacturing method thereof.

BACKGROUND OF THE INVENTION

Recent years have seen dramatic developments in the liquid crystal display using a liquid crystal panel, and the liquid crystal display is expected to be a substitute for cathode-ray-tube displays that are most widely used as display devices at present. Among these liquid crystal displays, the liquid crystal display of the active-matrix driving type, which is most commonly used, adopts an active element for each pixel so as to drive the pixel electrode by using this active element.

In the liquid crystal display of the active-matrix driving type, a liquid crystal panel is used in which a liquid crystal layer is sealed between a light-transmitting substrate (hereinafter, referred to as a substrate on the active-element side) having the active elements formed thereon and a light-transmitting substrate (hereinafter, referred to as an opposing substrate) that faces the substrate on the active-element side.

On the substrate on the active-element side, a plurality of scanning lines and a plurality of signal lines are formed in a matrix format so as to orthogonally intersect each other. At each of the intersections of this matrix, a pixel electrode is formed so as to apply a voltage to the liquid crystal, and a switching element is also formed thereat so as to selectively drive the pixel electrode. Active elements, such as TFTs (Thin Film Transistors), diodes and MIM (Metal Insulator Metal) elements, are adopted as the switching elements.

In the liquid crystal display of the active-matrix driving type, however, when there are wiring irregularities due to the scanning lines and signal lines formed on the substrate on the active-element side, display unevenness tend to occur in the vicinity of the wiring due to disclination of the liquid crystal molecules. As illustrated in FIG. 7, in order to avoid this problem, a conventional device provides a light-shielding film 32 (indicated by hatched regions in the Figure) having a matrix pattern that covers a wider area than signal lines 30 and scanning lines 31 formed on the substrate on the active element side. The display unevenness due to the disclination that occur in the vicinity of wiring can be covered with the light-shielding film 32.

The light-shielding film 32 also has the effect of preventing the active elements 33 from degradation in characteristics due to light. However, the light-shielding film 32 of this type, which is formed on the opposing substrate with a wide width, results in a reduction in the aperture rate of the liquid crystal display.

In order to solve the problem of the reduction of the aperture rate, a conventional arrangement is known in which a thick flattening film (having an insulating property) is formed on the active elements. In this arrangement, the irregularities of the wiring are alleviated by the flattening film on the active elements. Since the irregularities are alleviated, it is possible to prevent the occurrence of disclination in the liquid crystal molecules in the vicinity of the wiring. Further, it becomes possible to stack the pixel electrodes on the wiring with the flattening film interpolated in between. Thus, the aperture rate of the liquid crystal display can be improved.

Meanwhile, with respect to a method for controlling a gap between the substrate on the active-element side and the opposing substrate, a conventional arrangement is well known in which spacers are placed between the substrate on the active-element side and the opposing substrate. With respect to the method for placing the spacers, a wet spraying method and a dry spraying method are commonly used. In the wet spraying method, a volatile solution containing spacers dispersed therein is sprayed onto one of the substrates, and in the dry spraying method, spacers, as they are, are sprayed onto one of the substrates.

In the liquid crystal display having spacers that are placed as described above, however, the spacers are also sprayed onto the pixel electrodes. For this reason, liquid crystal does not exist in the spacer portions on the pixel electrodes, and light which is made incident on the spacer portions is always transmitted. Therefore, for example, in the case of a liquid crystal panel (normally white) which shows black display upon application of a driving voltage, the portions at which the spacers are located always show white display. These white-display portions result in a problem in which the contrast ratio of the conventional liquid crystal display decreases to a great degree.

Moreover, when the two substrates are joined to each other, since the above-mentioned spacers have a globular shape, the spacers come into point-contact with the respective substrates at the portions where they are located. This makes it difficult to obtain a gap with sufficient accuracy.

In order to solve the above-mentioned problem, for example, (1) Japanese Patent Publication No. 301040/1994 (Tokukaihei No. 6-301040) discloses a method in which: aperture sections are provided in a light-shielding film having a matrix pattern that covers signal electrodes, etc. except for pixel electrodes, photo-reactive resin and spacers are applied thereto in association with the aperture sections, and the spacers are secured by exposing them with light through the aperture sections from the back-surface side.

Further, (2) Japanese Patent Publication No. 181317/1996 (Tokukaihei No. 7-181317) discloses a method in which: a positive-working photosensitive resin is applied to intersecting portions of a light-shielding film having a matrix pattern that is placed on a color-filter substrate, and the photosensitive resin is patterned by exposure from the back-surface side by using the light-shielding film as a mask so that a gap-controlling layer is formed.

However, in the gap-controlling processes between the respective substrates of methods (1) and (2) as described above, the photosensitive resin (photo-reactive resin) has to be applied only to the portion except for the pixelelectrode portion or to the intersecting portions of the light-shielding film having a matrix pattern. For this reason, upon application of the photosensitive resin, a printing plate or a dispenser of a certain type is required. Moreover, in the methods (1) and (2), it becomes difficult to positively apply the photosensitive resin to the portion except for the electrode portion, as liquid crystal panels with higher precision are developed and as the wiring becomes finer.

Furthermore, method (1) requires an additional process for removing the unreacted portion of the photosensitive resin after the spacers have been secured. In addition, even in the above-mentioned methods (1) and (2), it is necessary to form a light-shielding film with a wide width in order to prevent defects in display due to the aforementioned disclination. Consequently, the problem of a reduction in the aperture rate is presented in the same manner.

SUMMARY OF THE INVENTION

The present invention is made so as to solve the above mentioned problems, and its objective is to positively form a gap-controlling layer that carries out a gap-controlling process with higher precision as compared with a conventional device without the need for a special printing plate, dispenser, or a special photomask, etc., and also to provide a liquid crystal display having a high aperture rate and a manufacturing method thereof, by studying the above-mentioned arrangement of the substrate on the active-element side.

The liquid crystal display of the present invention is provided with 1) a first substrate having one surface on which scanning lines, signal lines and active elements are formed and on which a plurality of pixel electrodes that are driven by the active elements are formed with an insulating flattening film interpolated in between, the insulating flattening film covering the scanning lines, the signal lines and the active elements, and 2) a second substrate having one surface on which a light-shielding film and opposing electrodes are formed. The first substrate and the second substrate are bonded to each other by a seal member that is formed on the peripheral portion and liquid crystal is sealed in a gap whose gap-dimension is controlled by a gap-controlling layer formed between the first substrate and the second substrate. The light-shielding film on the second substrate side is formed by a first pattern that is constituted by a plurality of light-shielding sections corresponding to installation positions of the active elements so as to shield the active elements on the first substrate side from light, and the gap-controlling layer is formed by a second pattern that has the same pattern as the light-shielding film.

With this arrangement, since wiring irregularities on the driving wires such as the scanning lines and the signal lines are alleviated by the flattening film formed on the first substrate, it is possible to suppress display unevenness that is caused by disclination of the liquid crystal molecules. Therefore, the light-shielding film, formed on the second substrate, is only required to shield the active elements on the first substrate side from light. Therefore, the light-shielding film is formed as the first pattern that corresponds to the installation positions of the active elements so as to shield said active elements from light. In the above-mentioned arrangement, since the light-shielding film is omitted from the positions on the driving wires, it becomes possible to avoid a reduction in the aperture rate due to the light-shielding film, and consequently to provide a liquid crystal display with a high aperture rate.

Moreover, the gap-controlling layer is formed to have the second pattern that is the same pattern as the light-shielding film. Thus, the gap between the first substrate and the second substrate, that is, the gap between the pixel electrodes on the first substrate and the opposing electrodes on the second substrate is maintained at a constant value, and since the gap-controlling layer is biasedly located at positions facing the light-shielding film, no spacers exist on the pixel electrodes. Therefore, it is possible to eliminate white-color display due to spacers located on the pixel electrodes, and consequently to prevent degradation in the contrast ratio.

A manufacturing method of the liquid crystal display of the present invention in which the liquid crystal display having the above-mentioned arrangement is used is provided with the steps of: applying a positive-working photosensitive resin layer onto the entire surface of a substrate main body on which the light-shielding film has been formed during a process for forming the second substrate and exposing the photosensitive resin by applying light from the back-surface side of the substrate main body and then developing the photosensitive resin so as to form the gap-controlling layer.

In the above-mentioned manufacturing method, the gap-controlling layer, which is to be formed within the light-shielding region of the light-shielding film, is formed by applying the positive-working photosensitive resin layer to the entire surface of the second substrate and exposing the resulting resin. Therefore, the first pattern is formed as an island pattern which allows the light-shielding films to be located separately. Consequently, even if the light-shielding films are interpolated between the first substrate and the second substrate, no problem is raised when a liquid crystal material is sealed into a cell between the first substrate and the second substrate.

Moreover, in the case when the gap-controlling layer is formed, it is not necessary to use a special printing plate or a dispenser. Furthermore, since the light-shielding film, as it is, can be used as a photomask, no specific mask is required. Therefore, it is not necessary to provide strict alignments so as to use photomasks, and it is possible to manufacture the liquid crystal panel by using simple processes. Thus, it becomes possible to meet the demands for finer wiring resulted from higher-precision liquid crystal panels.

Another manufacturing method of the liquid crystal display of the present invention in which the liquid crystal display having the above-mentioned arrangement is used is provided with the steps of: applying positive-working photosensitive resin onto the entire surface of a substrate main body on which the light-shielding film has been formed during a process for forming the second substrate, spraying spacers for controlling the gap dimension on the applied photosensitive resin layer and then pressing the spacers so that one portion of each of the spacers is embedded into the photosensitive resin layer, and exposing the photosensitive resin by applying light from the back-surface side of the substrate main body after the embedding of the spacers and then developing the photosensitive resin layer so as to form the gap-controlling layer.

In the above-mentioned manufacturing method, the spacers are formed on the light-shielding film, and further embedded to the photosensitive resin layer. For this reason, it is possible to avoid the disadvantage of separation of the spacers upon bonding the first and second substrates or on other occasions. Therefore, in the liquid crystal display having the above-mentioned arrangement, the gap between the pixel electrodes and the opposing electrodes can be more preferably maintained at a constant value. Further, the gap dimension is determined by the dimension of the spacer diameter. Thus, compared with the aforementioned manufacturing method wherein the gap dimension is determined by the layer thickness of the photosensitive resin layer, advantages, such as easy control for the gap dimension in a set manner, can be obtained although the number of processes increases.

For a fuller understanding of the nature and advantages of the invention, reference should be made to the ensuing detailed description taken in conjunction with the accompanying drawings.

DESCRIPTION OF THE EMBODIMENTS

Referring to Figures, the following description will discuss one embodiment of the present invention.

First, referring to FIG. 1, an explanation will be given of the arrangement of a liquid crystal display of the present embodiment.

Figure 1:
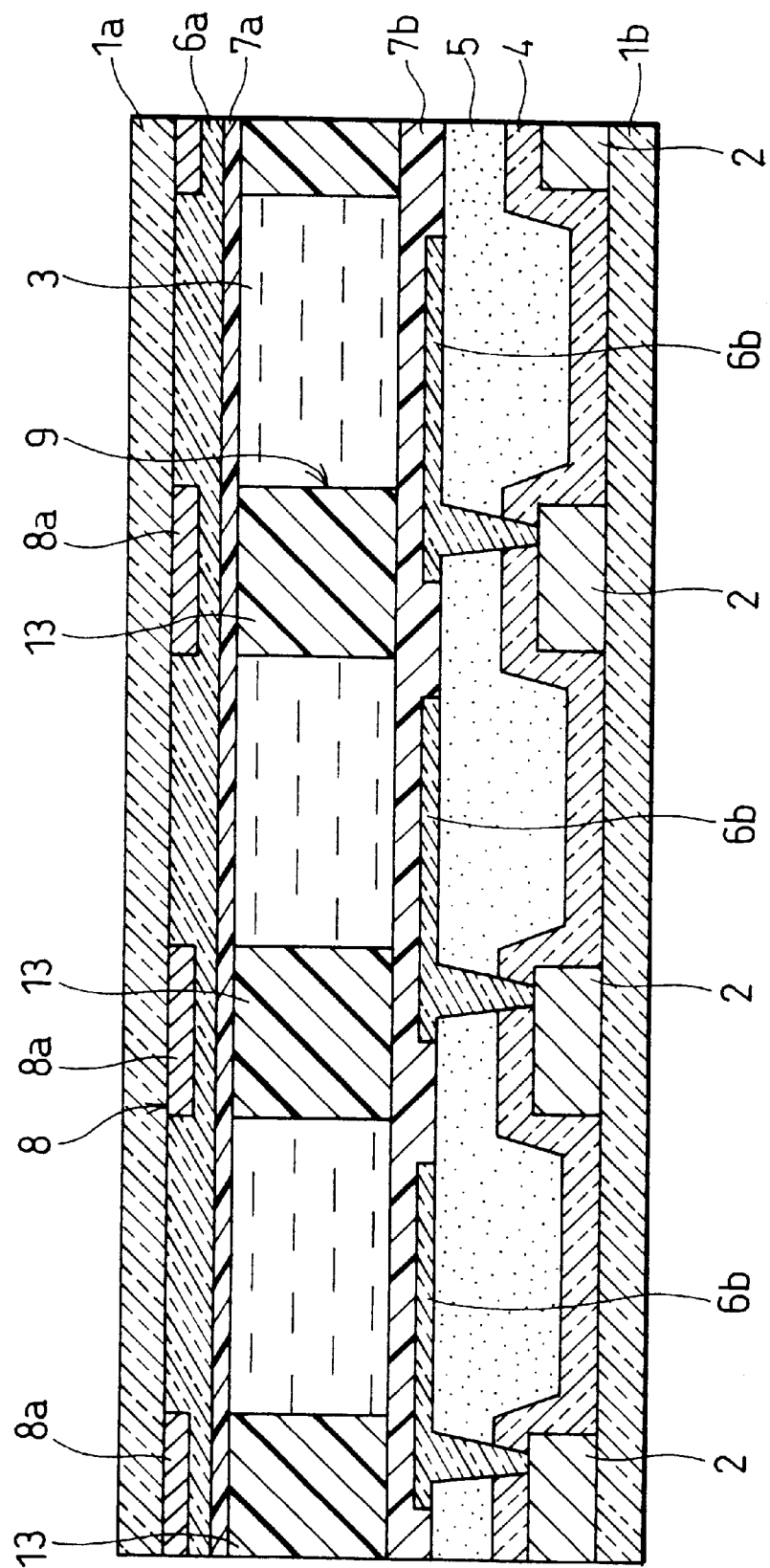
FIG. 1 is a partial cross-sectional view of a liquid crystal display that shows one embodiment of the present invention.

FIG. 1 shows a partial cross-sectional view of the present liquid crystal display. As illustrated in this figure, in the liquid crystal display, a pair of light-transmitting substrates (substrate main bodies) 1a and 1b are placed face to face with each other with a gap-controlling layer 9 located in between. A liquid crystal layer 3 is sandwiched between the substrates 1a and 1b. Transparent substrates, made of glass, quartz and other materials, are used as the substrates 1a and 1b.

Figure 2:
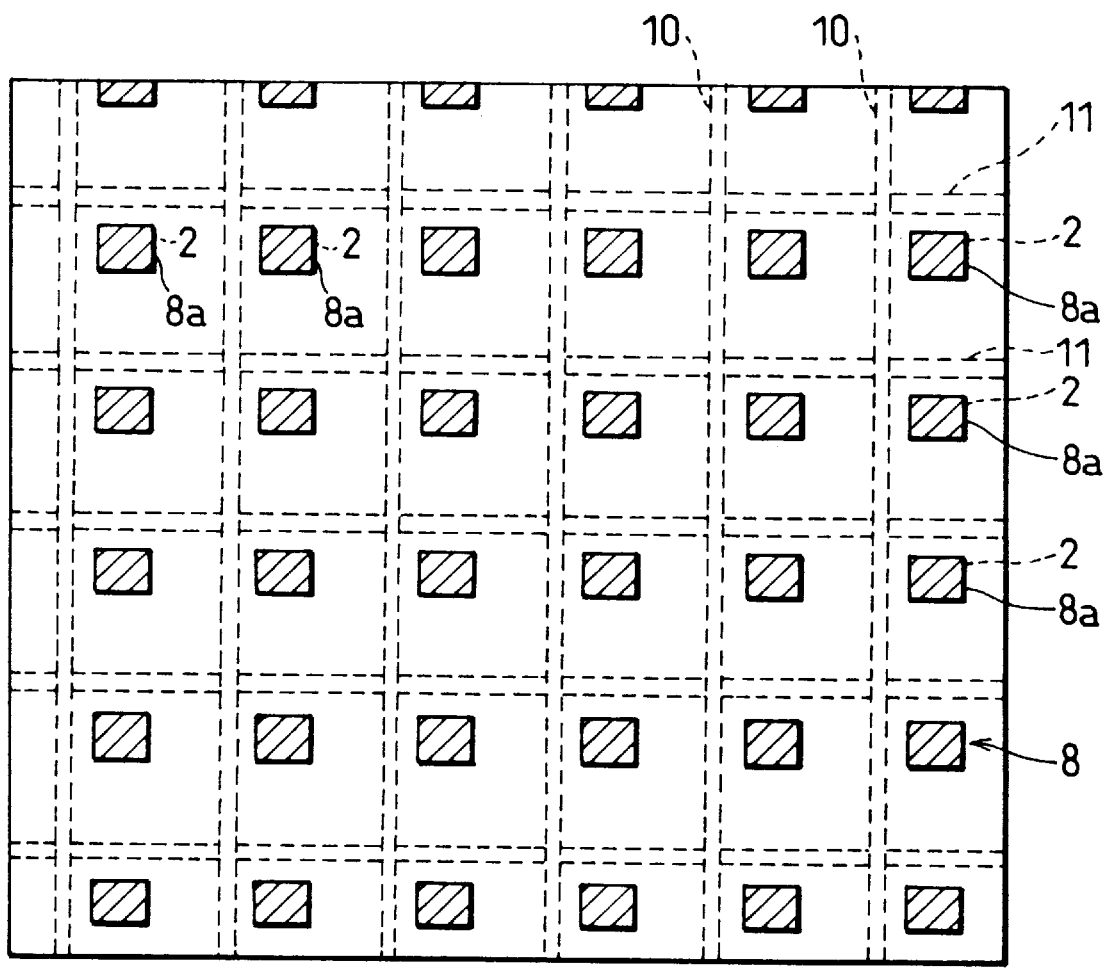
FIG. 2 is an explanatory drawing that shows a pattern of a light-shielding film that is formed on an opposing substrate (a second substrate) in the above-mentioned liquid crystal display.

On the surface facing the liquid-crystal layer 3 of the substrate 1b that forms a substrate on the active-element side (a first substrate), a plurality of scanning lines 11 and a plurality of signal lines 11, which serve as driving wires, are placed in a matrix format so as to orthogonally intersect each other, as shown in FIG. 2. An active element 2 for driving a pixel electrode 6b is formed at each of the intersections of these driving wires. An insulating protective film 4 is formed on the active elements 2 in a manner so as to cover the active elements 2. Further, an insulating flattening film 5 is formed on the protective film 4.

A plurality of pixel electrodes 6b, which are formed by patterning a transparent electrode film into pixel shapes, are formed on the surface of the flattening film 5 in association with the individual active elements 2. The associated pixel electrodes 6b and active elements 2 are electrically connected respectively through contact holes. Further, an alignment film 7b is formed on the pixel electrodes 6b.

Elements such as thin-film transistors, diodes and MIM elements can be used as the active elements 2. Materials such as SiNx and SiOx can be used as the protective film 4. Here, the protective film 4 is not necessarily required. However, it is preferable to place the protective film 4 in the cases when the flattening film 5 does not have a high insulating property and when the flattening film 5 contains ionic impurities, since it has the effect for preventing degradation in the characteristics of the active elements 2. For example, polyimide is used as the flattening film 5. For example, ITO (Indium Tin Oxide) films are used as transparent electrode films that constitute the pixel electrodes 6b. Moreover, for example, polyimide is used as the alignment film 7b.

On the surface facing the liquid-crystal layer 3 of the substrate 1a that forms an opposing substrate (a second substrate), a light-shielding film 8, shown in FIG. 2 (indicated by hatched regions in the Figure), is formed in order to prevent degradation due to light in the active elements 2 formed on the above-mentioned substrate 1b. The pattern of the light-shielding film 8 forms a first pattern (hereinafter, referred to as an island pattern) wherein small light-shielding sections 8a, each having a shape (which is given as a rectangular shape, but is not intended to be limited thereby) so as to cover each of the active elements 2, are arranged in association with the installation positions of the active elements 2.

Opposing electrodes 6a made of a transparent electrode film are placed on the entire surface of the light-shielding film 8. An alignment film 7a is formed on the opposing electrode 6a, and on this is further formed a gap-controlling layer 9 that is formed by a second pattern so as to have the same island pattern as the light-shielding film 8. In other words, the gap-controlling layer 9 is designed to face the light-shielding film 8 and to be located within the light-shielding regions provided by the light-shielding film 8.

Light-shielding materials of metals, such as aluminum and tantalum, or other substances are used as the light-shielding film 8. For example, an ITO film is used as the transparent electrode film for the opposing electrodes 6a in the same manner as the pixel electrodes 6b. Further, a positive-working photosensitive resin or other material is used as the gap-controlling layer 9. Here, the positive-working photosensitive resin refers to a resin which has its exposed portion removed by a developer while having its unexposed portion allowed to remain without being removed by the developer.

Next, referring to FIGS. 1 through 3, an explanation will be given of a manufacturing method of the present liquid crystal display.

Figure 3:
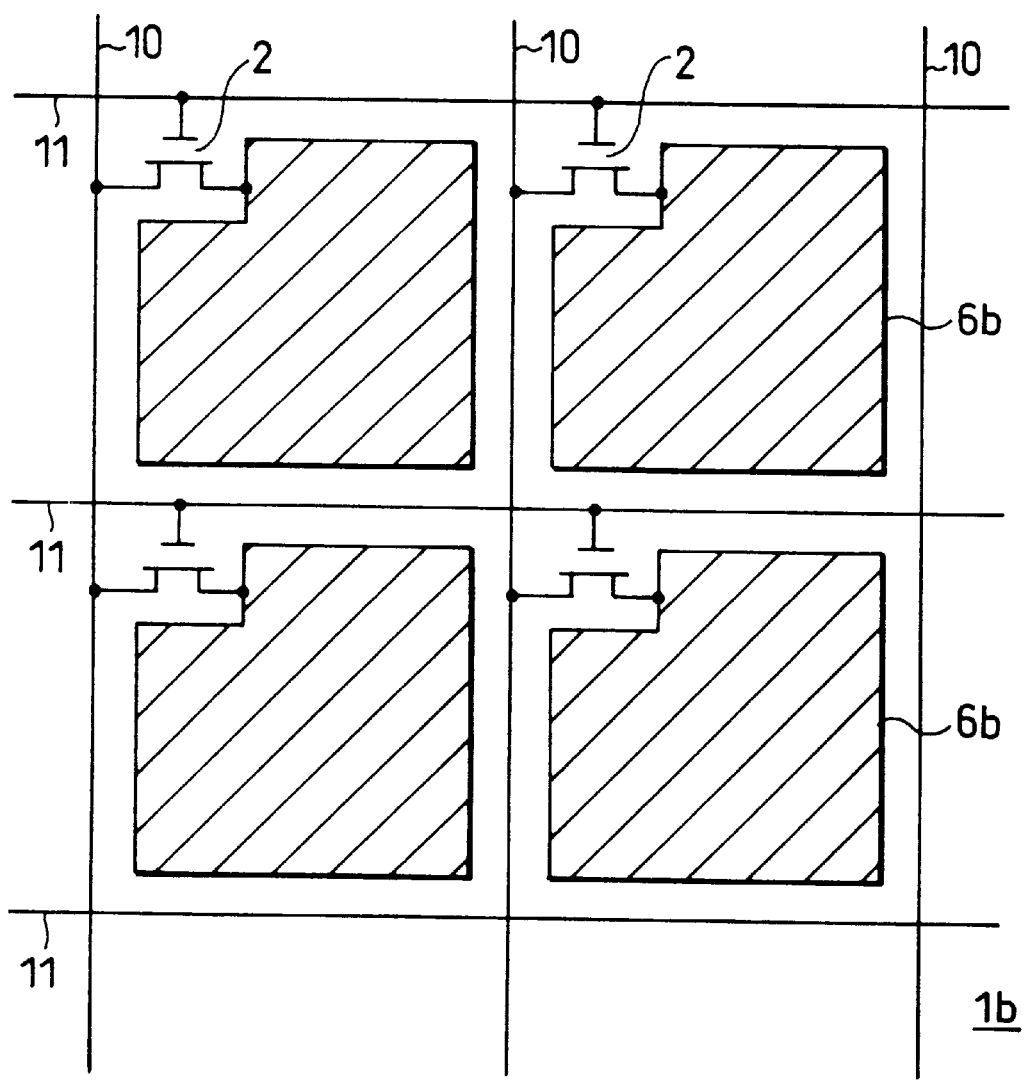
FIG. 3 is an explanatory drawing that schematically shows an arrangement of a substrate on the active-element side (a first substrate) in the above-mentioned liquid crystal display.

As illustrated in FIG. 3, signal lines 10 and scanning lines 11 are formed on a substrate 1b in a matrix format so as to orthogonally intersect each other. Then, an active element 2 is formed at each of the intersections of the signal lines 10 and the scanning lines 11. FIG. 3 exemplifies a case in which thin-film transistors are used as the active elements 2.

Next, a protective film 4, shown in FIG. 1, is formed in a manner so as to cover the signal lines 10, the scanning lines 11 and the active elements 2. Further, a flattening film 5 is formed on the entire surface of the protective film 4.

Successively, contact holes, which are used to electrically connect the pixel electrodes 6b and the associated active elements 2, are patterned. Thereafter, the pixel electrodes 6b are formed by forming a transparent electrode film on the entire surface of the flattening film 5 and patterning the film. Further, an alignment film 7b is formed in a manner so as to cover the pixel electrodes 6b.

On the substrate 1a, a light-shielding material layer, made of a light-shielding material, is formed on the entire surface thereof. As illustrated in FIG. 2, this light-shielding material layer is patterned so as to fit the shapes and installation positions of the active elements 2 formed on the other substrate 1b; thus, a light-shielding film 8 having an island pattern is formed. Then, a transparent electrode film is formed on the entire surface of the light-shielding film 8 so as to provide opposing electrodes 6a. Further, an alignment film 7a is formed on the surface of the opposing electrodes 6a.

Next, alignment treatments, such as a rubbing process, are applied to the alignment films 7a and 7b formed on the respective substrates 1a and 1b.

Figure 4A:
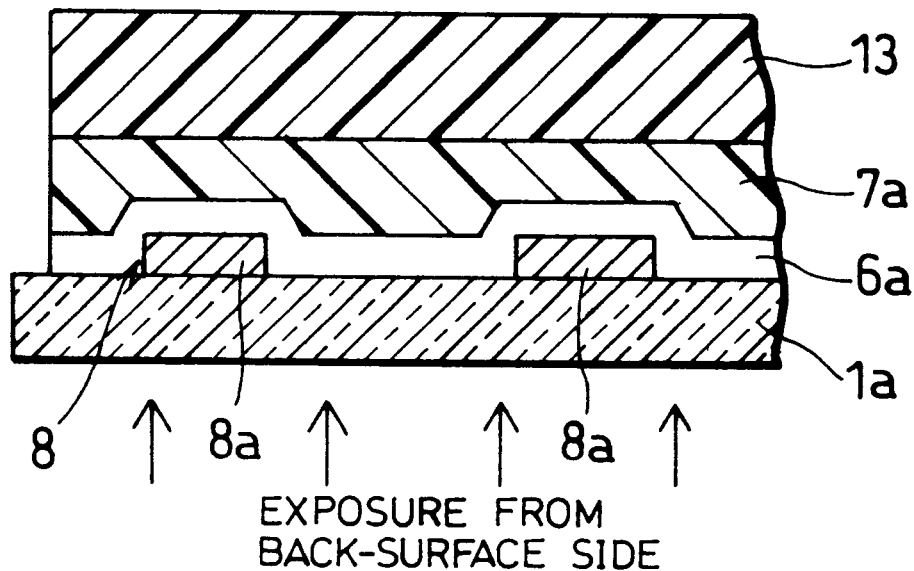
FIG. 4(a) is a cross-sectional view that illustrates a process for forming a photosensitive resin layer which is one of the manufacturing processes of the above-mentioned liquid crystal display.

Thereafter, a gap-controlling layer 9 is formed on the alignment film 7a on the substrate 1a as described below. First, as illustrated FIG. 4(a), a positive-working photosensitive resin 13 is uniformly applied to the entire surface of the alignment film 7a by a spinner coating method or other methods, and the film thickness is adjusted to a predetermined dimension, that is, a set value for the gap dimension, so that the photosensitive resin 13 is formed. The adjustment of the film thickness is made by changing the concentration of the resin ingredients of the photosensitive resin and the number of rotations and time of the spinner coating process. For example, the film thickness is adjusted to 5 μm with a spinner coating of 1400 rpm for 20 seconds.

Next, with respect to the surface of the substrate 1a to which the photosensitive resin layer 13 has been formed, the photosensitive resin layer 13 is exposed with the light-shielding film 8 being used as a photomask from the back-surface side that is the opposite-surface side. In this case, in the photosensitive resin layer 13, although portions facing the light-shielding film 8 are shielded from light, portions other than these portions are exposed through the opposing electrodes 6a and the alignment film 7a. Then, after the exposure, the photosensitive resin layer 13 except for the portions facing the light-shielding film 8 is removed by developing it by using pure water or a weak alkaline developer.

Figure 4B:
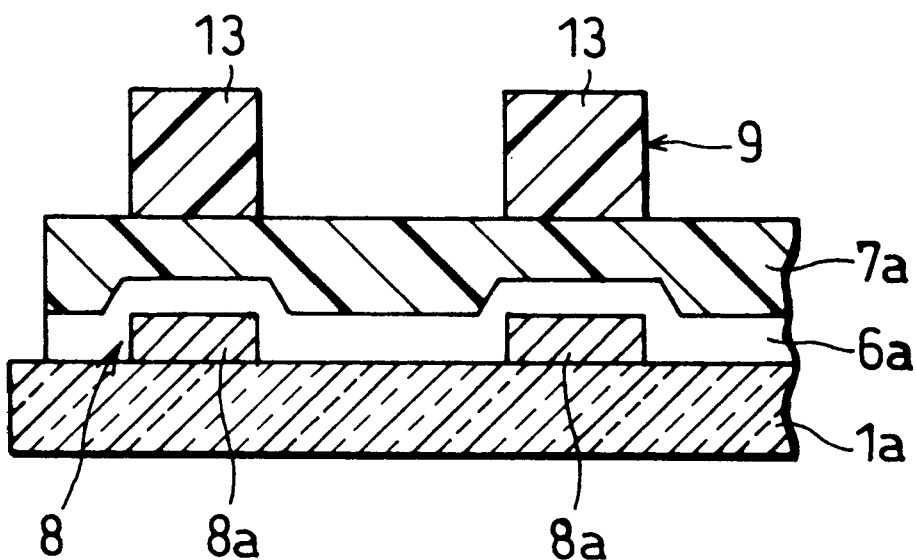
FIG. 4(b) is a cross-sectional view that illustrates a process for forming a gap-controlling layer which is one of the manufacturing processes of the above-mentioned liquid crystal display.

Thus, as illustrated in FIG. 4(b), a gap-controlling layer 9 having the same island pattern as the light-shielding film 8 is formed. In other words, the first pattern that is the pattern of the light-shielding film 8 and the second pattern that is the pattern of the gap-controlling layer 9 have the same island pattern. Here, the gap-controlling layer 9 is allowed to have the same function as the light-shielding film 8 by coloring the photosensitive resin layer 13 by preliminarily adding a pigment thereto, or making it acquire a color later, or using other processes. Consequently, it becomes possible to effectively prevent degradation in characteristics of the active elements 2 due to light.

Thereafter, the substrates 1a and 1b are bonded by using seal members (not shown) that are placed on the peripheral portion and that contains spacers. Liquid crystal material is vacuum-injected into the gap between the joined substrates 1a and 1b so that a liquid crystal layer 3 is formed. Thus, the liquid crystal display of the present invention is manufactured.

With respect to spacers that are contained in the seal members, those spacers each of which has a diameter dimension that is the same (or virtually the same) as the film thickness of the gap-controlling layer 9 are adopted. In the case of the above-mentioned example using the gap-controlling layer 9 with a film thickness of 5 μm, seal members with which spacers of 5 μm are mixed are used. With respect to the liquid crystal material forming the liquid crystal layer 3, for example, nematic liquid crystal of ZL-4792 (Brand Name: manufactured by Merck Japan & Co., Inc.) or other materials may be used.

In the liquid crystal display of the present embodiment that was manufactured as described above, the flattening film 5 suppresses display unevenness occurring on wiring due to disclination of the liquid crystal molecules. Therefore, the light-shielding film 8, formed on the substrate 1a, is required only to shield the active elements 2 on the substrate 1b side from light. Therefore, the light-shielding film 8 is provided as an island pattern consisting of a plurality of light-shielding sections 8a that are placed in association with the installation positions of the active elements so as to shield the active elements 2 from light. Thus, it becomes possible to avoid a reduction in the aperture rate due to the light-shielding film 8, and consequently to achieve a high aperture rate.

Moreover, the gap-controlling layer 9 is formed in the shape of pillars with a constant film thickness in accordance with the island pattern of the light-shielding film 8; therefore, it is possible to maintain the gap between the substrate 1b and the substrate 1a, that is, the gap between the pixel electrodes 6b and the opposing electrodes 6a, at a constant value. Further, the gap-controlling layer 9 formed in a manner as described above prevents the spacers from being located on the pixel electrodes 6b.

Therefore, it is possible to eliminate white-color display that always appears on the display screen due to spacers located on the pixel electrodes, which has been a conventional problem to be solved. As a result, it is possible to prevent degradation of the contrast ratio on the display screen of the liquid crystal display. Thus, it becomes possible to meet the demands for finer wiring resulting from higher-precision liquid crystal panels.

Figure 7:
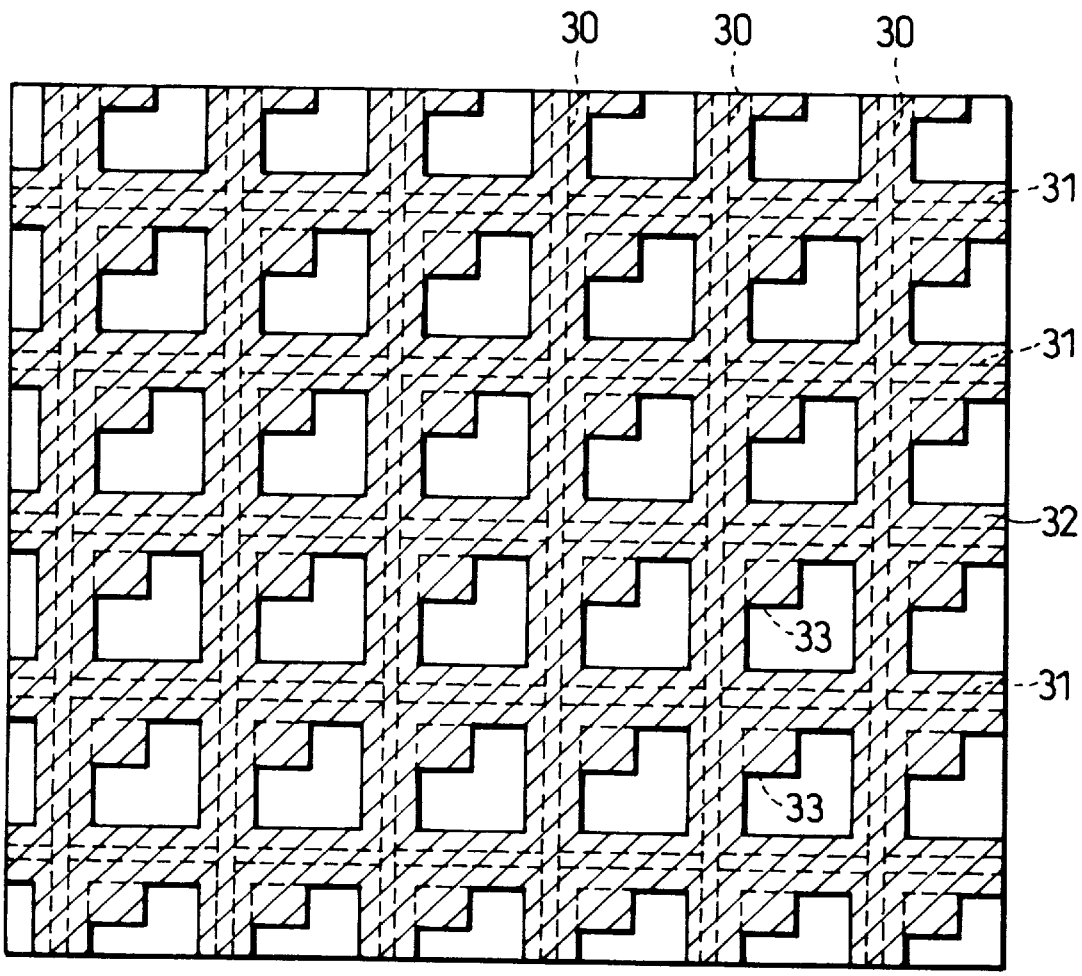
FIG. 7 is an explanatory view that shows the pattern of a light-shielding film formed on the opposing substrate of a conventional liquid crystal display.

In a conventional light-shielding film 32 having a matrix pattern as shown in FIG. 7, a positive-working photosensitive resin, which is to form a gap-controlling layer, is applied onto the entire surface of a substrate main body, and the gap-controlling layer is formed by exposing from the back-surface side of the substrate main body using the preliminarily formed light-shielding film 32 as a photomask; and in this case, the gap-controlling layer is formed so as to have the same matrix pattern as the light-shielding film 32. For this reason, after the substrate 1b having the active elements formed thereon and the substrate 1a have been bonded, it becomes impossible to inject liquid crystal material into the gap between the substrates.

For this reason, in a conventional method for forming the gap-controlling layer, the photosensitive resin has to be applied onto certain portions of the light-shielding film 32, such as intersecting portions of the matrix pattern thereof. In this case, the application of the photosensitive resin has to be carried out by an applying method, such as a printing method and a dispenser method. However, as liquid crystal panels with higher precision have been developed and as the wiring has become more finer, it becomes difficult for these methods to positively apply the photosensitive resin to the portions except for the pixel electrode portions.

In contrast, when the light-shielding film 8 is provided as the island pattern as is disclosed by the present invention, even in the case when the positive-working photosensitive resin 13 is applied onto the entire surface of the main body of the substrate 1b and the gap-controlling layer 9 is patterned by exposing from the back-surface side of the main body of the substrate 1b using the preliminarily formed light-shielding film 8 as a photomask and then developing the resin, since the gap-controlling layer 9 has the island pattern, no problem is raised in the injection of the liquid crystal material even after it has been bonded to the substrate 1a.

In accordance with the above-mentioned manufacturing method, the gap-controlling layer 9, which is to be formed on portions except for the pixel electrodes 6b so as not to reduce the contrast ratio, can be simply formed in a proper manner, without using a conventional method such as a printing method and a dispenser method.

[EMBODIMENT 2]

Referring to Figures, the following description will discuss another embodiment of the present invention. Here, for convenience of explanation, those members that have the same functions and that are described in the above-mentioned embodiment are indicated by the same reference numerals and the description thereof is omitted.

Figure 5:
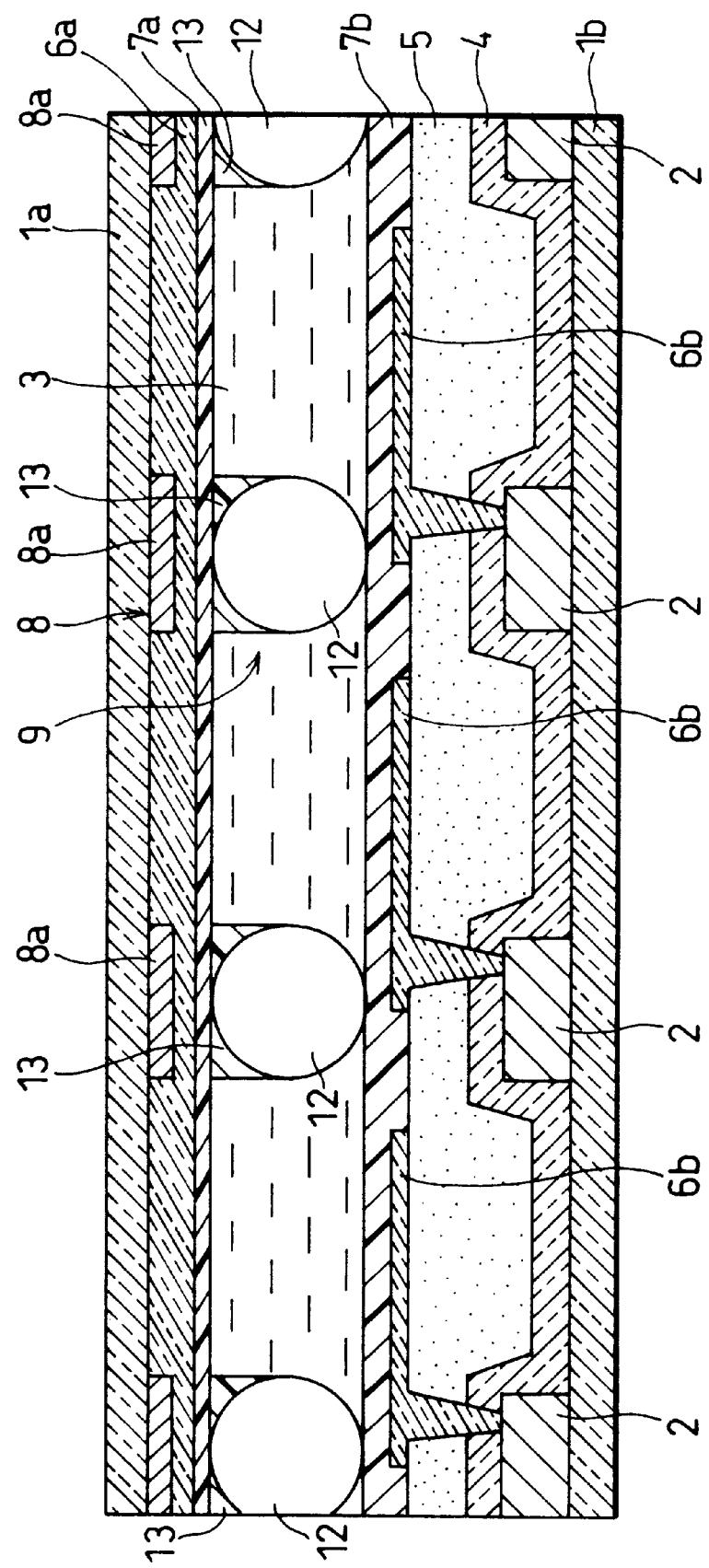
FIG. 5 is a partial cross-sectional view of a liquid crystal display that shows another embodiment of the present invention.

As illustrated in the partial cross-sectional view of FIG. 5, the liquid crystal display of the present embodiment differs from the liquid crystal display of FIG. 1 only in the construction of its gap-controlling layer 9. In other words, the gap-controlling layer 9 of the liquid crystal display of FIG. 1 is constituted only by the positive-working photosensitive resin layer 13, while the gap-controlling layer 9 of the present liquid crystal display is constituted by the positive-working photosensitive resin layer 13 and spacers 12.

An explanation will be given below of a manufacturing method of the present liquid crystal display. Here, the explanation is given only of the formation process of the gap-controlling layer 9 that is different from the aforementioned manufacturing method of the liquid crystal display of FIG. 1. The description of the other processes is omitted since they are the same as those of Embodiment 1.

Onto the substrate 1a that has been subjected to the processes up to the alignment treatment of the alignment film 7a, a positive-working photosensitive resin is applied by a spinner coating method or other methods, so as to cover the entire surface thereof. In this case, in the same manner as Embodiment 1, the photosensitive resin material 13 may be preliminarily colored by adding a pigment thereto, or making it acquire a color later, or using other processes. Such a coloring process allows the gap-controlling layer 9 to have the same function as the light-shielding film 8. Consequently, it becomes possible to more effectively prevent degradation in characteristics of the active elements 2 due to light.

Figure 6:
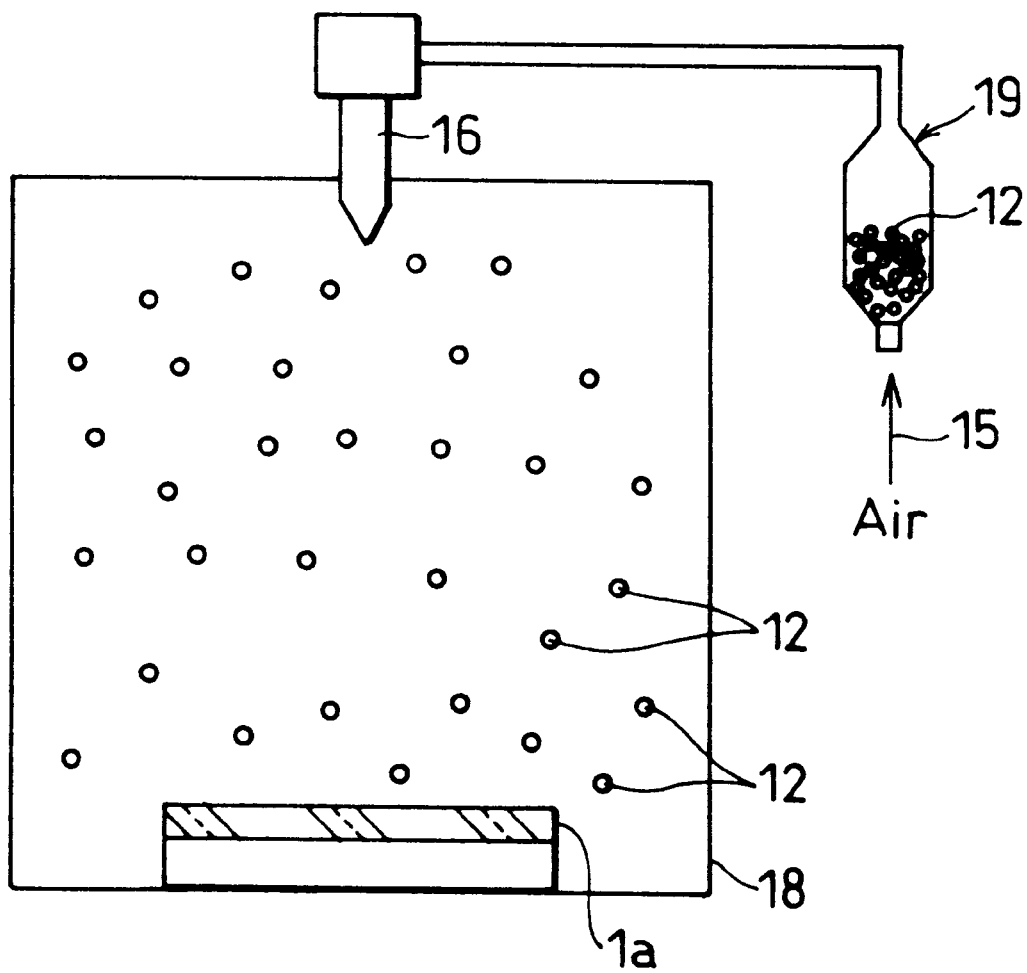
FIG. 6 is a schematic side view that shows the construction of a spacer-spraying device.

Next, spacers 12 are dry-sprayed by using a spacer-spraying device as shown in FIG. 6. In this case, each of the spacers 12 has a diameter dimension that is the same (virtually the same) as the gap dimension set on the surface of the substrate 1a. For example, in the case of a gap dimension of 5 µm, the spacers 12, each having a diameter dimension of 5 µm, are used.

This spacer-spraying device is constituted by a chamber 18 that houses a substrate 1a on which the photosensitive resin layer 13 is formed and a discharging section 19 for discharging the spacers 12 from a spacer holder through a nozzle 16 that is placed on the upper portion of the chamber 18. Pressurized air 15 is sent to the spacer holder, and the spacers 12 are discharged into the chamber 18 through the pressurized air 15.

Next, the substrate 1a on which the spacers 12 have been sprayed is sandwiched by a pair of plates (not shown) with a superior flatness that are made of, for example, glass, and pressure is applied so as to depress them. Thus, each of the spacers 12 is embedded to the photosensitive resin layer 13 at least in its one portion, and is secured thereto. In this case, the depressing pressure is preferably set so as to properly embed the spacers 12 and so as not to impose too much load onto the substrate 1a. More specifically, for example, a pressure value in the degree of 1.0 kg/cm$^2$ is preferably applied.

Thereafter, the photosensitive resin layer 13 is exposed from the back-surface side of the substrate 1a by using the light-shielding film 8 as a photomask. In this case, in the photosensitive resin layer 13, although portions having the light-shielding film 8 are shielded from light, portions other than these portions are exposed through the opposing electrodes 6a and the alignment film 7a. Then, after the exposure, a developing process is carried out by using pure water or a weak alkaline developer. Consequently, the photosensitive resin layer 13 and the spacers 12 are removed from the portions having the light-shielding film 8 so that a gap-controlling layer 9 having the same island pattern as the light-shielding film 8 is formed.

In the liquid crystal display of the present embodiment that was manufactured as described above, the spacers 12 are formed on the light-shielding film 8, and further embedded to the photosensitive resin layer 13. For this reason, it is possible to avoid the disadvantage of separation of the spacers 12 upon bonding the substrates 1a and 1b or on other occasions. Therefore, the gap between the pixel electrodes 6b and the opposing electrodes 6a can be maintained at a constant value.

Moreover, in the same manner as Embodiment 1, the formation of the gap-controlling layer 9 as described above eliminates the presence of the spacers 12 on the pixel electrodes 6b. Therefore, it is possible to eliminate white-color display due to spacers 12 located on the pixel electrodes 6b which has been a conventional problem, and consequently to prevent degradation in the contrast ratio.

Furthermore, the above-mentioned gap-controlling layer 9 can be formed by using the positive-working photosensitive resin layer 13 and applying it to the entire surface of the substrate 1a. For this reason, when the gap-controlling layer 9 is formed, it is not necessary to use a special printing plate or a dispenser. Furthermore, since the gap-controlling layer 9 is formed by using the light-shielding film 8 as a photomask, no specific mask is required. Therefore, it is not necessary to provide strict alignments so as to use photomasks, and it is possible to manufacture the liquid crystal panel by using simple processes. Thus, it becomes possible to meet the demands for finer wiring resulted from higher-precision liquid crystal panels.

In addition, in the gap-controlling layer 9 of the present embodiment, the gap dimension is determined only by the dimension of the diameter of the spacers 12. Thus, compared with the gap-controlling layer 9 of Embodiment 1 whose gap dimension is determined by the film thickness of the photosensitive resin layer 13, advantages, such as easy control for the gap dimension in a set manner, can be obtained although the number of processes increases.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A manufacturing method of a liquid crystal display comprising the steps of:

forming a first substrate which has driving wires, active elements and a plurality of pixel electrodes that are driven by the active elements and the driving wires, wherein a flattening film is formed to cover the driving wires and the active elements;

forming a second substrate which has a light-shielding film in an island pattern and opposing electrodes;

bonding the first substrate and the second substrate together through seal members that are formed on peripheral portions thereof with the electrode-formed surfaces aligned face to face with each other; and sealing a liquid crystal material into a gap whose dimension is controlled by a gap-controlling layer that is formed between the first substrate and the second substrate, wherein during the process for forming the second substrate, a positive-working photosensitive resin layer is applied onto the entire surface of the substrate main body on which the light-shielding film for shielding the active elements from light has been formed, the photosensitive resin is exposed with light that is applied from the back-surface side of the substrate main body using the light-shielding film as a mask and the resulting photosensitive resin layer is developed so that the gap-controlling layer is formed within the light-shielding region of the light-shielding film.

2. The manufacturing method of a liquid crystal display as defined in claim 1, wherein the gap-controlling layer contains spacers.

3. The manufacturing method of a liquid crystal display as defined in claim 2, further comprising a step of spraying the spacers for controlling the gap dimension on the applied photosensitive resin layer and then depressing the spacer so that at least one portion of each of the spacers is embedded in the photosensitive resin layer.

4. A method of manufacturing a liquid crystal display comprising:

forming a light-shielding layer in an island pattern on a surface of a first substrate;

applying a photosenstive layer over said light-shielding layer;

exposing said photosensitive layer using said light-shielding layer as a mask;

developing said photosensitive layer to provide spacing layer portions which are aligned with portions of said light-shielding layer;

spacing said first substrate apart from a second substrate having active elements formed thereon using said spacing layer portions, said light-shielding layer being opposed to said active elements such that said light-shielding layer shields substantially only said active elements from light; and disposing a liquid crystal material in the space between said first and second substrates.

* * * * *